United States Patent [19]

Koci et al.

[11] 4,297,100

[45] Oct. 27, 1981

[54] AQUEOUS DYE PREPARATIONS

[75] Inventors: Zdenek Koci, Binningen; Hans Mollet, Reinach, both of Switzerland

[73] Assignee: Ciba-Geigy Corporation, Ardsley, N.Y.

[21] Appl. No.: 67,584

[22] Filed: Aug. 17, 1979

Related U.S. Application Data

[63] Continuation of Ser. No. 896,418, Apr. 14, 1978, abandoned.

[30] Foreign Application Priority Data

Apr. 19, 1977 [CH] Switzerland ............................ 4808/77

[51] Int. Cl.³ ........................... D06P 1/52; D06P 1/16; D06P 1/10; D06P 1/41
[52] U.S. Cl. ........................................... 8/527; 8/557; 8/558; 8/637; 8/650; 8/561
[58] Field of Search ................... 8/18 A, 91, 557, 558, 8/637, 527

[56] References Cited

U.S. PATENT DOCUMENTS

| | | | |
|---|---|---|---|
| 1,976,679 | 10/1934 | Fikentscher et al. | 8/18 A |
| 2,063,987 | 12/1936 | Dreyfus | 8/87 |
| 2,146,755 | 2/1939 | McNally et al. | 8/91 |
| 2,994,676 | 8/1961 | Kucsan et al. | 8/18 A |
| 3,086,831 | 4/1963 | Robbins | 8/91 |
| 3,223,471 | 12/1965 | Kuth et al. | 8/91 |
| 3,471,248 | 10/1969 | Schaeuble et al. | 8/169 |
| 3,765,832 | 10/1973 | Shelso et al. | 8/91 |
| 3,861,869 | 1/1975 | Schwindt et al. | 8/18 A |
| 3,912,677 | 10/1975 | Baker et al. | 8/18 A |
| 3,957,427 | 5/1976 | Chambers | 8/18 A |
| 3,978,016 | 8/1976 | Perrunin et al. | 8/18 A |
| 4,036,587 | 7/1977 | Wolf et al. | 8/92 |
| 4,095,942 | 6/1978 | Dellian et al. | 8/62 |
| 4,197,087 | 4/1980 | Ami et al. | 8/554 |

FOREIGN PATENT DOCUMENTS

| | | | |
|---|---|---|---|
| 369915 | 3/1932 | United Kingdom | 8/92 |
| 871193 | 6/1961 | United Kingdom | 8/18 A |
| 1185843 | 3/1970 | United Kingdom | . |
| 1209241 | 10/1970 | United Kingdom | 8/18 A |
| 1240509 | 7/1971 | United Kingdom | 8/18 A |
| 1308163 | 2/1973 | United Kingdom | . |

*Primary Examiner*—Joseph L. Schofer
*Assistant Examiner*—Maria Parrish Tungol
*Attorney, Agent, or Firm*—Edward McC. Roberts

[57] ABSTRACT

Aqueous dye preparations having a migration-regulating action and containing at least one dye insoluble in water, a dispersing agent and at least one further additive, which preparations are characterized in that they contain at least one water-soluble polymerization product containing carboxyl groups.

9 Claims, No Drawings

AQUEOUS DYE PREPARATIONS

This is a continuation of application Ser. No. 896,418 filed on Apr. 14, 1978, now abandoned.

The invention relates to aqueous dye preparations, to a process for producing them, and to their use for continuously dyeing textile materials, and also to the dyed textile material.

It is known that in the dyeing of textile materials by the continuous process with dyes insoluble in water it frequently occurs that unlevel dyeings are obtained, the reason for which is that on drying of the impregnated and squeezed-out textile material the dyes migrate on the textile material. In order to overcome these disadvantages, it has already been suggested that special migration inhbitors be added to the padding bath. These known migration inhibitors are primarily high-molecular, water-soluble polymers, which in general cannot be incorporated into liquid formulations because these inhibitors have an agglomerating effect and hence result in preparations which are unstable in storage. In the case of the vast majority of dyes, such products cannot be used moreover on account of their high viscosity.

It is also already known to add specific migration inhibitors to liquid dye preparations, for example as described in the U.S. Pat. No. 3,484,180 (methylcellulose) and in the U.S. Pat. No. 3,139,321 (mixture of monomeric and polymeric quaternary salts of dialkylaminoacrylates) and also in the German Pat. No. 1,290,521 (tetraalkylbutyne-1,4-diols).

The main disadvantage of these known liquid dye preparations is however their poor storage stability and temperature stability, as well as their non-redispersibility.

The object of the present invention was therefore to find suitable migration inhibitors which can be incorporated into liquid formulations and which reduce or even eliminate the stated disadvantages.

It has now been found that polymerisation products containing carboxyl groups, when added to liquid dye formulations, surprisingly both impart to the formulations good storage stability and reduce the migration of the dyes, particularly with the use of formulations of this kind in continuous processes for textile materials and in the presence of the customary small amounts of electrolytes in the padding bath, in consequence of which there are obtained level dyeings which moreover have good general fastness properties.

The invention hence relates to aqueous dye preparations having a migration-regulating action and containing at least one dye insoluble in water, a dispersing agent and at least one further additive, which preparations are characterised in that they moreover contain at least one water-soluble polymerisation product containing carboxyl groups.

Suitable dyes insoluble in water are such dyes which have a solubility in water at a temperature of 20° C. of less than 5 g/l of water. From a coloristic point of view, these are in particular disperse dyes, vat dyes, sulphur dyes and pigment dyes, which can be selected from the widest range of chemical classes of dyes. The disperse dyes applicable are, for example, nitro, aminoketone, ketonimine, methine, polymethine, diphenylamine, quinoline, benzimidazole, xanthene, oxazine, aminonaphthoquinone or coumarin dyes, and particularly anthraquinone and azo dyes such as mono- or disazo dyes, all free from carboxylic acid groups and/or sulphonic acid groups. In the case of vat dyes, these are dyes which are applied in a solid, dispersed form to the fabric and which after development are again in a water-insoluble form. The dyes mentioned are known. The preparations can however also contain mixtures of dyes insoluble in water. The amounts of dyes in the preparations vary from 5 to 50 percent by weight, relative to the total preparation.

It is possible optionally to also add water-soluble dyes to the dye preparations according to the invention, for example reactive dyes, when mixed fabrics for example of polyester and cotton are to be dyed.

Suitable dispersing agents are both nonionic and, preferably, anionic dispersing agents. Suitable nonionic dispersing agents are for example: addition products of, e.g., 5 to 100 mols of alkylene oxide, especially ethylene oxide, with higher fatty acids, with saturated or unsaturated fatty alcohols, with fatty acid amides or with alkylphenols, the alkyl moieties of which contain at least 7 carbon atoms, and some of the ethylene oxide units may be substituted by propylene oxide. Anionic dispersing agents are for example: lignin sulphonates, sulphated lignin products, as well as condensation products of aromatic sulphonic acids with formaldehyde, such as condensation products from formaldehyde and naphthalenesulphonic acids or alkylnaphthalenesulphonic acids, e.g. the disodium salt of di-(6-sulphonaphthyl-2)-methane, or from formaldehyde, naphthalenesulphonic acid and benzenesulphonic acid, or a condensation product from crude cresol, formaldehyde and naphthalenesulphonic acid. The anionic dispersing agents are usually in the form of their alkali metal salts, their ammonium salts or their water-soluble amine salts. The dispersing agents are used in an amount of 0.1 to 5, preferably 0.5 to 3, particularly 0.5 to 1.5, percent by weight, relative to the total amount of the preparation.

Suitable water-soluble polymerisation products containing carboxyl groups, or mixtures thereof, usable according to the invention are those having a molecular weight of about 400–300,000, especially 1000 to 50,000. These are anionic polyelectrolytes, particularly in the form of their ammonium or alkali metal salts, e.g. potassium or sodium salts, or amine salts, e.g. ammonium salts substituted by lower alkyl or lower alkanol, such as the diethanolamine salts. The following polymerisation products can for example be used:

(a) homopolymers of $\alpha,\beta$-ethylenic unsaturated monocarboxylic acids or polyvalent carboxylic acids or their anhydrides, which have been subsequently saponified for example with aqueous alkalies, ammonia or amines, and which can be optionally substituted by hydroxyl groups and/or aldehyde groups. They are for example homopolymers of acrylic acid, methacrylic acid, maleic acid, fumaric acid, itaconic acid, crotonic acid and $\alpha$-hydroxyacrylic acid;

(b) co- and terpolymers of $\alpha,\beta$-ethylenic unsaturated monocarboxylic acids or polyvalent carboxylic acids or anhydrides thereof; or with other polymerisable monomers, such as unsaturated aliphatic or aromatic hydrocarbons, vinyl ethers, vinyl esters, methacrylic acid alkyl esters as well as unsaturated glyceride oils and diene polymers. These co- and terpolymers can also be substituted by hydroxyl groups and/or aldehyde groups.

These polymerisation products can be produced for example by oxidative copolymerisation of acrolein and acrylic acid, followed by neutralisation and reaction according to Cannizzaro with aqueous sodium hydroxide; or alternatively by hydrolysis of epoxidised mono- or polyunsaturated carboxylic acids.

Preferred polymerisation products containing carboxyl groups are copolymers, particularly polyhydroxycarboxylates and polyaldehydecarboxylates according to German Offenlegungsschrift No. 1,904,940, or homopolymers of acrylic or methacrylic acid.

The polymerisation products containing carboxyl groups are used in an amount of 0.5 to 30, preferably 5 to 10, percent by weight, relative to the total amount of the preparation.

The water-soluble polymerisation products containing carboxyl groups, according to the invention, are known.

The production of the polyoxycarboxylates preferably used is described, for example, in the "Chemiker-Zeitung" 96 (1972), No. 4, pp. 199 to 207.

In the case of the further additives which are added to the liquid formulations, these are in particular fungicides such as pentachlorophenolate, and bactericides such as an aqueous formaldehyde solution; antifreezing agents such as ethylene glycol or propylene glycol; antifoaming agents, and auxiliaries serving to improve redispersibility of the liquid formulations.

The following may be mentioned as examples of suitable auxiliaries for improving redispersibility: (a) amino compounds, optionally substituted by hydroxyl, carboxyl and/or epoxy groups, for example glycine, 1-aminopropionic acid, 2-aminopropionic acid, betaine hydrate, choline, potassium glutamate, N-methyl glucamine, 2-amino-2-methyl-propanediol-1,3,2-amino-2-ethyl-propanediol-1,3 and tris-(hydroxymethyl)-aminomethane, as well as hydrolysed proteins having a molecular weight up to 10,000;

(b) complexing agents such as ethylenediaminetetraacetic acid, nitrilotriacetic acid, N-hydroxyethyl-ethylenediaminetriacetic acid, diethylenetriaminepentaacetic acid, N,N-(diphydroxyethyl)-glycine and N-(hydroxyethyl)-iminodiacetic acid, amino-tri-(methylene-phosphonic acid), 1-hydroxyethane-1,1-diphosphonic acid, α-aminoethanediphosphonic acid, methylenediphosphonic acid and ethylenediphosphonic acid; as well as their Na, K, NH$_4$, Li, mono-, di- and triethanolammonium salts;

(c) saccharides and polysacchardies, such as maltose, saccharosemonolaurate, and adducts of 1 mol of methyl glucoside with 5 to 20 mols of ethylene oxide; and heteropolysaccharides such as xanthane gum;

(d) potassium salts, lithium salts, ammonium salts, choline salts, and amine salts optionally substituted by lower alkyl or hydroxy-lower-alkyl, of monomeric hydroxycarboxlic acids each containing at least one hydroxyl group and one carboxyl group in the molecule, and/or of heterocyclic mono- and dicarboxylic acids: examples which may be mentioned are lactic acid, α-hydroxyisobutyric acid, gluconic acid, glycolic acid, pyrrolidone-2-carboxylic acid, pyridine-3-carboxylic acid and pyridine-2,6-dicarboxylic acid.

The additives are used in amounts of 0.1 to 30 percent by weight, relative to the total amount of the preparation.

These liquid formulations are obtained by introducing, with stirring, the water-insoluble dye, or mixture of dyes, into an aqueous solution containing the water-soluble polymerisation product containing carboxyl groups, the further additives and the dispersing agent; and then homogenising the mixture at room temperature for about 10 to 30 minutes. The dispersion is subsequently ground until the particle size of the dye(s) is smaller than 10μ, particularly smaller than 2μ, and the grinding medium is separated from the dispersion.

The dye dispersion obtained is very readily pourable and redispersible, and also stable in storage over several months at a temperature of −10° C. to +50° C. The dyes in the dye preparations according to the invention exhibit, particularly on application in continuous processes, a lower degree of migration, which can be still further reduced by the addition of customary electrolytes, such as Glauber's salt or sodium chloride, to the padding bath.

The liquid formulation according to the invention is used especially in a continuous dyeing process (padding process) for textile materials which can be dyed with dyes insoluble in water. With the use of vat dyes, the formulations can be advantageously used for continuously dyeing cellulose; with the use of disperse dyes, advantageously for continuously dyeing polyester materials; or with the use of vat dyes and disperse dyes advantageously for continuously dyeing mixed fabrics of polyester and cellulose; with the textile material, subsequent to the impregnating and squeezing operations, being intermediately dried, for example for 2 to 3 minutes at 100° to 120° C.

The invention is further illustrated by the following Examples without being limited by them. Temperatures are given in degrees centigrade and 'parts' denote parts by weight. The individual tests were carried out as follows:

Migration Test

Two strips of a fabric (8×35 cm) are padded and immediately afterwards are pinned on top of one another (back side on back side) to the frame of a dryer. The lateral edges of the "sandwich" thus formed are stitched together at intervals of about 5 cm. Drying is subsequently carried out for 3 minutes at 120° C.

Evaluation: Difference in strength of colour between the "right" side of the upper strip and the "back" side of the lower strip by means of the Gray Scale for assessing colour change and/or remission measurements.

The migration result is evaluated using ratings 1 to 5: migration rating 1=greatest migration (greatest difference in strength of colour); migration rating 5=virtually no migration (no difference in strength of colour).

Storage stability test

The liquid dye preparation is stored in a sealed bottle for 14 days at +40° C. or +50° C. and −10° C, respectively. An amount of 3 g of the preparation is then stirred with 200 ml of desalted water for 2 minutes on a magnetic stirrer at 750 r.p.m.; it is subsequently filtered through a round filter SS 1450 CV, and the filter is rinsed with 50 ml of desalted water. For storage stability to be rated as being good, there has to be no filter residue remaining on the paper filter.

Redispersibility 1.5 g of the liquid dye preparation in a 400 ml beaker is applied in the form of a thin layer to the bottom of the beaker, and stored open at room temperature for 3 and 7 days, respectively. The dried residue is then diluted with 100 ml of desalted water; it is stirred for 2 minutes on the magnetic stirrer at 750 r.p.m., filtered through the round filter SS 1450 CV having a diameter of 7 cm, and rinsed with 50 ml of desalted water. For redispersibility to be rated as being good, there has to be no residue or only a slight amount of residue on the paper filter.

EXAMPLE 1

37 parts of the dry dye of the formula

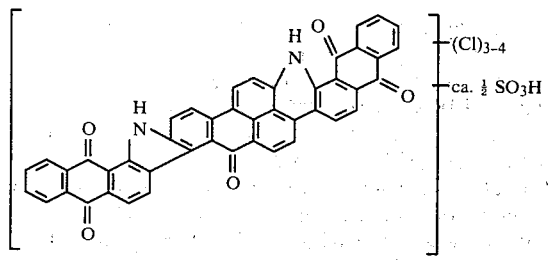

are slowly introduced, with vigorous stirring, into a solution of 106.5 parts of water containing 1.5 parts of an anion-active dispersing agent (formaldehyde condensed with the sodium salt of naphthalenesulphonic acid), 10 parts of polyhydroxycarboxylate (molecular weight about 5400, $COO^{\ominus}:OH^{\ominus}=7:9$, produced according to German Offenlegungsschrift No. 1,904,940), 1 part of the sodium salt of pentachlorophenolate, 15 parts of an auxiliary [e.g. tris-(hydroxymethyl)-aminomethane] and 29 parts of ethylene glycol, and the whole is homogenised for about 20 minutes at room temperature. The dye suspension obtained is then ground in an open mill, by means of 400 parts of siliquartzite balls ($\phi$3 mm), for 8 hours until the mean particle size of the dye is about 1$\mu$. The grinding balls are separated to leave a liquid dye preparation which has very good stability in storage over 2 to 3 months at $-10°$, $+40°$ and $+50°$, and which is readily redispersible.

Two strips of a cotton fabric are padded, in the manner stated in the migration test described in the foregoing, with a liquor containing per liter 40 g of the dye preparation obtained above, with the addition of 5 g of Glauber's salt per liter and 2 ml of 80% acetic acid per liter, and then dried at 120° for 3 minutes. The dyeing is level and it has a migration rating of 3 to 4.

If a liquid preparation not containing the polycarboxylate addition according to the invention is used instead of the above preparation, the resulting dye preparation is unstable in storage and, with the addition of electrolyte, gives an unstable padding liquor.

Liquid preparations which contain, instead of the polycarboxylate according to the invention, 10 parts of a soluble dispersing agent containing sulphonate groups, such as the sodium salt of the condensation product of naphthalenesulphonic acid and formaldehyde, exhibit on application severe migration (migration rating 1).

Besides with the auxiliary tris-(hydroxymethyl)-aminomethane, good storage stability and redispersibility are obtained also with betaine, the lithium salt of lactic acid, N-methyl glucamine, 2-amino-2-methyl-1,3-propanediol or 15 parts of a 2% by weight aqueous solution of xanthane gum (M.W. > 1 million).

EXAMPLE 2

46 parts of the dried dye of the formula

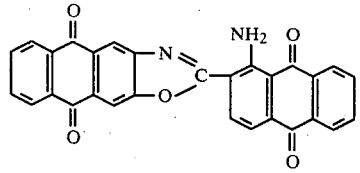

are slowly introduced, with vigorous stirring, into a solution of 3.5 parts of an anion-active dispersing agent (condensation product of formaldehyde with the sodium salt of naphthalene-sulphonic acid), 38 parts of the sodium salt of polyacrylic acid (M.W. 8000), 2 parts of 30% aqueous formaldehyde solution, 10 parts of the auxiliary bentaine base-monohydrate, 0.4 part of xanthane gum (M.W.>1 million), 36 parts of ethylene glycol and 64.1 parts of water, and the whole is homogenised for about 20 minutes at room temperature. This dye suspension is then ground in an open mill, by means of 400 parts of siliquartzite balls ($\phi$3 mm), for 8 hours until the mean particle size of the dye is about 1$\mu$. The grinding balls are separated to leave a low-viscous liquid dye preparation which has a very good stability in storage over several months at $+40°$, $+50°$ and $-10°$, and which is readily redispersible.

With the use of this dye preparation for padding a cotton fabric, at a concentration of 40 g/l of padding liquor with the addition of 5 g of Glauber's salt per liter, the levelly dyed cotton fabric, after intermediate drying for 3 minutes at 120°, is given in the migration test described in the foregoing a migration rating of 3 to 4.

If 38 parts of the sodium salt of polymethacrylic acid (M.W. 6000) are used instead of 38 parts of the sodium salt of polyacrylic acid (M.W. 8000), there is obtained a liquid dye preparation which likewise has good stability in storage, and which has the migration rating 4 when applied under conditions identical to those described in the foregoing.

EXAMPLE 3

38.4 parts of the dried dye of the formula

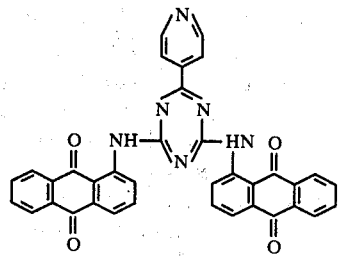

are slowly introduced, with vigorous stirring, into a solution of 0.5 part of an anion-active dispersing agent (condensation product of formaldehyde and the sodium salt of naphthalene-sulphonic acid), 40 parts of a 30% aqueous solution of the polyaldehydecarboxylate copolymer (M.W. about 4300), produced according to the German Offenlegungsschrift No. 1,904,940 by oxidative copolymerisation of acrolein and acrylic acid, 1 part of the sodium salt of pentachlorophenolate, 15 parts of the auxiliary betaine-base-monohydrate, 35 parts of ethylene glycol and 70.1 parts of water; the whole is homogenised for 15 minutes at room temperature, and then ground in an open mill, by means of 400 parts of siliquartzite balls ($\phi$3 mm), for 14 hours until a mean particle size of the dye of 1μ is obtained. The grinding balls are removed to leave a thinly liquid dye preparation which has a very good stability in storage at +50° and at −10°, and a very good redispersing capacity.

On application of this dye preparation for padding a cotton fabric, at a concentration of 40 g/l of padding liquor with addition of 5 g of NaCl per liter and 2 ml of 80% acetic acid per liter, in the migration test described in the foregoing, the fabric has, after intermediate drying (3 minutes at 120°) a migration rating of 4 to 5 and the resulting dyeing is level.

If there are used, instead of the auxiliary mentioned, identical parts of 2-amino-2-ethyl-1,3-propanediol, triethanolamine salt of pyrrolidone-2-carboxylic acid, DL-alanine, potassium glutamate, maltose, N-methyl glucamine or 15 parts of a 15% aqueous solution of hydrolysed protein (M.W. 1500), a preparation having equally good storage stability and redispersing capacity is obtained.

EXAMPLE 4

37 parts of the dried dye of the formula

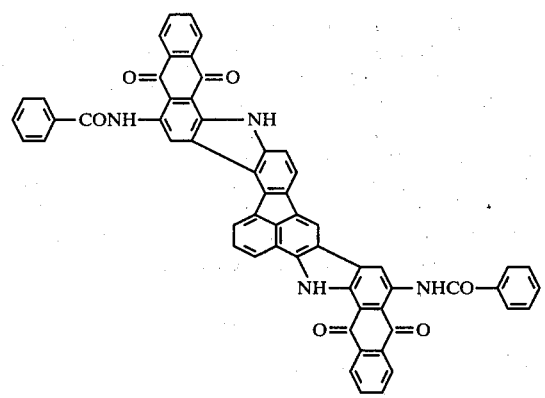

are slowly introduced, with vigorous stirring, into a solution of 3 parts of an anion-active dispersing agent (condensation product of formaldehyde with the sodium salt of methyl-naphthalene-sulphonic acid), 10 parts of the polyhydroxycarboxylate used in Example 1, 26 parts of the 30% aqueous solution of the sodium salt of the terpolymer n-octylmercaptan-acrylonitrile-acrylic acid (M.W. 1500), 2 parts of 30% aqueous formaldehyde solution, 15 parts of the auxiliary betaine base-monohydrate, 38 parts of ethylene glycol and 69 parts of water; the whole is then homogenised for 15 minutes, and subsequently ground in an open mill, by means of 400 parts of siliquartzite balls (φ3 mm), for 11 hours until the mean particle size of the dye is 1μ. The grinding balls are removed to leave a liquid dye preparation which has a good stability in storage at +40° and at −10°. Under conditions of application analogous to those described in Example 1, the dye has a migration rating of 3, and the dyeing obtained is level.

EXAMPLE 5

36 parts of the dye of the formula

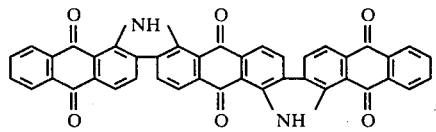

are slowly introduced, with vigorous stirring, into a solution of 4 parts of the sodium salt of a sulphated lignin (2 sulphonic acid groups per 1000 weight units of lignin-M.W.<30,000), 45 parts of a 20% aqueous solution of the sodium salt of the copolymer ethylene-maleic acid (M.W.<10,000), 2 parts of a 30% aqueous formaldehyde solution, 15 parts of the auxiliary betaine base-monohydrate, 35 parts of ethylene glycol and 63 parts of water; the whole is then homogenised for 15 minutes and subsequently ground at room temperature in an open mill, by means of 400 parts of siliquartzite balls (φ3 mm), for 11 hours until the mean particle size of the dye is 1μ. The grinding balls are separated to leave a liquid dye preparation which has good stability in storage at +40°, +50° and −10°, and which is readily redispersible.

If this dye preparation is applied at a concentration of 40 g/l of padding liquor to a cotton fabric in the migration test described in the foregoing, with the liquor additionally containing per liter 0.25 g of the adduct of 7 mols of ethylene oxide with 1 mol of tallow amine, and 2 ml of 80% acetic acid, there is obtained after intermediate drying (3 minutes at 120°) a levelly dyed cotton fabric which has a migration rating of 3 to 4.

If there is used, instead of the auxiliary betaine, identical parts of the tetrasodium salt of ethylenediaminetraacetic acid, the sodium salt of N,N-di-(hydroxyethyl)-glycine, or the sodium salt of hydroxyethane-1,1-diphosphonic acid, a dye preparation having an equally good stability in storage and being just as readily redispersible is obtained.

EXAMPLE 6

20 parts of the disperse dye mixture of the formulae

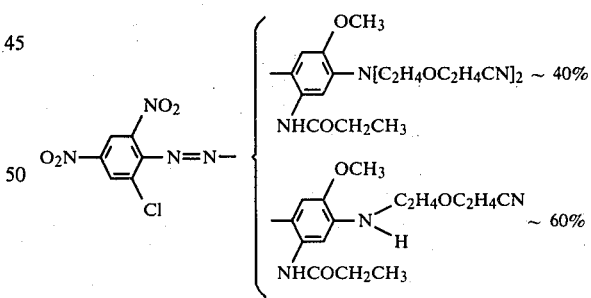

and 20 parts of the vat dye of the formula

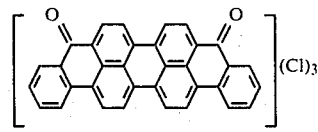

are slowly introduced, with vigorous stirring, into a solution of 1.5 parts of an anion-active dispersing agent (condensation product of formaldehyde with the sodium salt of naphthalene-sulphonic acid), 38 parts of the sodium salt of polyacrylic acid (M.W. 8000) used in Example 2, 2 parts of a 30% aqueous formaldehyde solution, 15 parts of betaine base-monohydrate, 35 parts of ethylene glycol and 68.5 parts of water, and the whole is then homogenised for 15 minutes at room temperature, and subsequently ground in an open mill, by means of 400 parts of siliquartzite balls (φ3 mm), for 20 hours until the mean particle size of the dye is 1μ. The grinding balls are separated to leave a liquid dye preparation which has good stability in storage at +40° and at −10°.

If in the migration test described in the foregoing the above dye preparation is applied at a concentration of 40 g/l of padding liquor with the addition of 20 g of Glauber's salt per liter and 1 ml of 80% acetic acid per liter to a polyester/cotton fabric (50:50), this fabric has after intermediate drying (3 minutes at 120° C.) a migration rating of 3 to 4 and is levelly dyed tone-in-tone.

EXAMPLE 7

40 parts of the disperse dye mixture used in Example 6 are ground with the same additives and amounts as in Example 6 until the mean particle size of the dye is 1μ. The result is a highly liquid dye preparation which has good stability in storage at +40° and at −10° over several months.

If in the migration test described in the foregoing this dye preparation is applied at a concentration of 40 g/l of padding liquor, with the addition of 20 g of Glauber's salt per liter and 2 ml of 80% acetic acid per liter, to a polyester fabric, this fabric after intermediate drying (2 minutes at 100°) has a migration rating of 3 and is levelly dyed.

EXAMPLE 8

24.0 parts of the dry dye of the formula

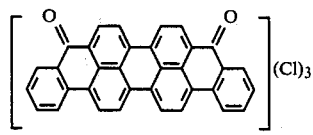

are slowly introduced, with vigorous stirring, into a solution of 42.65 parts of water containing 1.2 parts of an anion-active dispersing agent (formaldehyde condensed with the sodium salt of naphthalenesulphonic acid), 6.0 parts of the sodium salt of a polycarboxylate copolymer of acrylic acid, 1.0 part of a 30% aqueous solution of formaldehyde, 0.15 part of xanthane gum, 7.0 parts of commercial betaine base-monohydrate and 18.0 parts of ethylene glycol, and the whole is homogenised as described in Example 1, and subsequently ground until the particle size of the dye is 1–2μ. The grinding balls are separated to leave a liquid preparation which has very good stability in storage at +50° and at −10° and which is very readily redispersible.

EXAMPLE 9

18.0 parts of the dry dye given in Example 5 are slowly introduced, with vigorous stirring, into a solution of 47.8 parts of water containing 1.1 parts of an anion-active dispersing agent (formaldehyde condensed with the sodium salt of naphthalene-sulphonic acid), 7.0 parts of the sodium salt of a polycarboxylate copolymer of acrylic acid, 1.0 parts of a 30% aqueous solution of formaldehyde, 0.1 part of xanthane gum, 6.0 parts of commercial betaine base-monohydrate and 19.0 parts of ethylene glycol, and the whole is then homogenised as described in Example 1 and subsequently ground until the particle size of the dye is 1–2μ. After separation of the grinding balls, there remains a liquid dye preparation which has very good stability in storage at +50° and at −10° and which is very readily redispersible.

EXAMPLE 10

18.5 parts of the dry dye of the formula

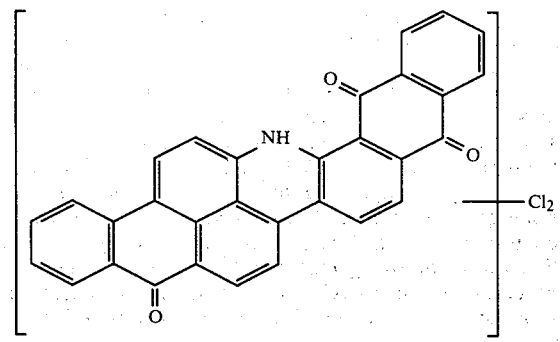

are slowly introduced, with vigorous stirring, into a solution of 47.65 parts of water containing 1.25 parts of an anion-active dispersing agent (formaldehyde condensed with the sodium salt of naphthalenesulphonic acid), 7.0 parts of the sodium salt of a polycarboxylate copolymer of acrylic acid, 1.0 part of a 30% aqueous solution of formaldehyde, 0.1 part of xanthane gum, 5.0 parts of commercial betaine base-monohydrate and 19.5 parts of ethylene glycol, and the whole is then homogenised as described in Example 1, and subsequently ground until the particle size of the dye is 1–2μ. After separation of the grinding balls, there remains a liquid dye preparation which has very good stability in storage at +50° and at −10° and which is very readily redispersible.

EXAMPLE 11

25.0 parts of the dry dye of the formula

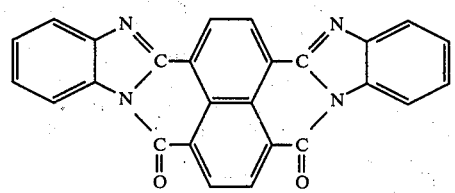

are slowly introduced, with vigorous stirring, into a solution of 41.05 parts of water containing 1.75 parts of an anion-active dispersing agent (formaldehyde condensed with the sodium salt of naphthalenesulphonic acid), 6.0 parts of the sodium salt of a polycarboxylate copolymer of acrylic acid, 1.0 part of a 30% aqueous solution of formaldehyde, 0.2 part of xanthane gum, 7.0 parts of commercial betaine base-monohydrate and 18.0 parts of ethylene glycol, and the whole is then homogenised as described in Example 1, and subsequently ground until the particle size of the dye is 1–2μ. After separation of the grinding balls, there remains a liquid dye preparation which has very good stability in storage at +50° and at −10°, and which is very readily redispersible.

EXAMPLE 12

20 parts of the dry dye of the formula

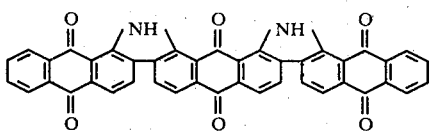

are slowly introduced, with vigorous stirring, into a solution of 44.85 parts of water containing 1.5 parts of an anion-active dispersing agent (formaldehyde condensed with the sodium salt of naphthalenesulphonic acid), 7.0 parts of the sodium salt of a polycarboxylate copolymer of acrylic acid, 1.0 part of a 30% aqueous solution of formaldehyde, 0.15 part of xanthane gum, 6.0 parts of commercial betaine base-monohydrate and 19.5 parts of ethylene glycol; and the whole is then homogenised as described in Example 1, and subsequently ground until the particle size of the dye is 1–2μ. Separation of the grinding balls leaves a liquid dye preparation which has very good stability in storage at +50° and at −10°, and which is very readily redispersible.

EXAMPLE 13

19.2 parts of the dry dye of the formula

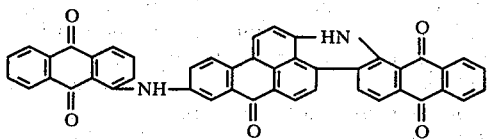

are slowly introduced, with vigorous stirring, into a solution of 33.8 parts of water containing 1.4 parts of an anion-active dispersing agent (formaldehyde condensed with the sodium salt of naphthalenesulphonic acid), 5.0 parts of the sodium salt of polyhydroxycarboxylate (produced according to German Offenlegungsschrift No. 1,904,940), 13.0 parts of the sodium salt of polyhydroxycarboxylate additionally containing sulpho groups (produced according to U.S. Pat. No. 3,646,099). 1.0 part of a 30% aqueous solution of formaldehyde, 0.1 part of xanthane gum, 7.5 parts of commercial betaine base-monohydrate and 19.0 parts of ethylene glycol; and the whole is homogenised as described in Example 1, and subsequently ground until the particle size of the dye is 1–2μ. After separation of the grinding balls, there remains a liquid dye preparation which has very good stability in storage at +50° and at −10°, and which is very readily redispersible.

We claim:

1. A storage-stable aqueous dye preparation consisting essentially of, relative to the total amount of the preparation:

5 to 50 percent by weight of at least one water-soluble dye;

0.1 to 5 percent by weight of a dispersing agent;

0.1 to 30 percent by weight of at least one further additive, said further additive being an auxiliary selected from the group consisting of:

(a) glycine, 1-aminopropionic acid, 2-aminopropionic acid, betaine hydrate, choline, potassium glutamate, N-methyl glucamine, 2-amino-2-methyl-propanediol-1,3,2-amino-2-ethyl-propanediol-1, 3,tris-(hydroxymethyl)-aminomethane, and hydrolysed proteins having a molecular weight up to 10,000;

(b) ethylenediaminetetraacetic acid, nitrilotriacetic acid, N-hydroxyethyl-ethylenediaminetriacetic acid, diethylenetriaminepentaacetic acid, N,N-(dihydroxyethyl)-glycine, N-(hydroxyethyl)-iminodiacetic acid, amino-tri-(methylenephosphonic acid), 1-hydroxyethane-1,1-diphosphonic acid, α-aminoethanediphosphonic acid, methylenediphosphonic acid, ethylenediphosphonic acid, and the Na, K, NH₄, Li, mono-, di- and triethanolammonium salts thereof;

(c) maltose, saccharose-monolaurate, adducts of 1 mol of methyl glucoside with 5 to 20 mols of ethylene oxides, and xanthane gum;

(d) potassium salts, lithium salts, ammonium salts, choline salts, and amine salts optionally substituted by lower alkyl or hydroxy-lower-alkyl, of lactic acid, α-hydroxy-isobutyric acid, gluconic acid, glycolic acid, pyrrolidone-2-carboxylic acid, pyridine-3-carboxylic acid, and pyridine-2,6-dicarboxylic acid;

0.5 to 30 percent by weight of at least one water-soluble anionic polyelectrolyte which is a synthetic polymerisation product containing carboxyl groups, having a molecular weight of 400 to 300,000, and is selected from the group consisting of (a) homopolymers of α, β-ethylenic unsaturated monocarboxylic acids or polyvalent carboxylic acids or their anhydrides, which have been subsequently saponified, (b) co- and ter-polymers of α, β-ethylenic unsaturated monocarboxylic acids or polyvalent carboxylic acids or anhydrides thereof, or co- and ter-polymers of α,β-ethylenic unsaturated monocarboxylic acids or polyvalent carboxylic acids or anhydrides thereof with other polymerisable monomers selected from unsaturated aliphatic or aromatic hydrocarbons, vinyl ethers, vinyl esters, methacrylic acid alkyl esters and unsaturated glyceride oils and diene polymers, and (c) homopolymers of (a) or co- and terpolymers of (b) which are substituted by hydroxyl groups, aldehyde groups, or hydroxyl groups and aldehyde groups;

and water to make up the remainder of the preparation.

2. A dye preparation according to claim 1, wherein the employed water-soluble polymerisation products containing carboxyl groups have a molecular weight of 1000 to 50,000.

3. A dye preparation according to claim 1, wherein the water-soluble polymerisation products containing carboxyl groups are used in the form of the alkali metal salts, ammonium salts or amine salts.

4. A dye preparation according to claim 1, wherein the water-insoluble dyes used are vat dyes or disperse dyes.

5. A dye preparation according to claim 1, wherein the further additives used are bactericides, fungicides, 6. A dye preparation according to claim 1, which contains as auxiliary: betaine base-monohydrate, tris-(hydroxymethyl)-aminomethane, N-methyl glucamine or 2-amino-2-methyl-1,3-propanediol.

7. A dye preparation according to claim 1, which contains the sodium salt of N,N-di-(hydroxyethyl)-glycine or the tetra-sodium salt of ethylenediaminetetraacetic acid as auxiliary.

8. A dye preparation according to claim 1, which contains xanthane gum as auxiliary.

9. A dye preparation according to claim 1, which contains the triethanolamine salt or choline salt of lactic acid or pyrrolidone-2-carboxylic acid as auxiliary.

* * * * *

UNITED STATES PATENT AND TRADEMARK OFFICE
CERTIFICATE OF CORRECTION

PATENT NO. : 4,297,100
DATED : OCTOBER 27, 1981
INVENTOR(S) : ZDENEK KOCI ET AL

It is certified that error appears in the above—identified patent and that said Letters Patent is hereby corrected as shown below:

Claim 1, Column 11, line 57 reads:

"5 to 50 percent by weight of at least one water-soluble"

Should read:

-- 5 to 50 percent by weight of at least one water-insoluble --

Claim 5, Column 12, lines 54-55 should read:

-- A dye preparation according to claim 1, wherein the further additives used are bactericides, fungicides, antifreeze agents, antifoaming agents or other auxiliaries. --

Signed and Sealed this

Sixteenth Day of March 1982

[SEAL]

Attest:

GERALD J. MOSSINGHOFF

Attesting Officer      Commissioner of Patents and Trademarks